United States Patent
Bahl et al.

(10) Patent No.: US 8,473,989 B2
(45) Date of Patent: Jun. 25, 2013

(54) ENABLING WHITE SPACE NETWORKS INDEPENDENT OF LOW-THRESHOLD SENSING

(75) Inventors: Paramvir Bahl, Bellevue, WA (US); Ranveer Chandra, Kirkland, WA (US); Thomas Moscibroda, Redmond, WA (US); Rohan Narayana Murty, Cambridge, MA (US)

(73) Assignee: Microsoft Corporation, Redmond, WA (US)

( * ) Notice: Subject to any disclaimer, the term of this patent is extended or adjusted under 35 U.S.C. 154(b) by 196 days.

(21) Appl. No.: 12/822,218

(22) Filed: Jun. 24, 2010

(65) Prior Publication Data

US 2011/0317019 A1 Dec. 29, 2011

(51) Int. Cl.
*H04N 7/20* (2006.01)

(52) U.S. Cl.
USPC ............... 725/73; 725/62; 725/141; 725/153

(58) Field of Classification Search
USPC .............................. 725/62, 133, 141, 153, 73
See application file for complete search history.

(56) References Cited

U.S. PATENT DOCUMENTS

| | | | |
|---|---|---|---|
| 6,785,904 B1 * | 8/2004 | Franken et al. | 725/54 |
| 7,174,145 B2 | 2/2007 | Chatelier et al. | |
| 2008/0130519 A1 | 6/2008 | Bahl et al. | |
| 2008/0232487 A1 | 9/2008 | Cleveland et al. | |
| 2008/0261639 A1 | 10/2008 | Sun et al. | |
| 2008/0268892 A1 | 10/2008 | Hamdi et al. | |
| 2009/0034457 A1 | 2/2009 | Bahl et al. | |
| 2009/0190537 A1 | 7/2009 | Hwang et al. | |
| 2009/0196180 A1 | 8/2009 | Bahl et al. | |
| 2009/0235316 A1 | 9/2009 | Wu et al. | |
| 2009/0298522 A1 | 12/2009 | Chaudhri et al. | |
| 2009/0312028 A1 | 12/2009 | Burchfiel | |
| 2012/0096498 A1 * | 4/2012 | Wu et al. | 725/81 |

OTHER PUBLICATIONS

Plummer, et al., "A Cognitive Spectrum Assignment Protocol Using Distributed Conflict Graph Construction", Retrieved at << http://ieeexplore.ieee.org/stamp/stamp.jsp?arnumber=04455299 >>, In Proceedings IEEE MILCOM, Oct. 2007, pp. 1-7.

Kim, et al., "In-band Spectrum Sensing in Cognitive Radio Networks: Energy Detection or Feature Detection?", Retrieved at << http://fuxi.cs.txstate.edu/~nasdg/papers/2008mobicom/In-band spectrum sensing in cognitive radio networks energy detection or feature detection 2008.pdf >>, International Conference on Mobile Computing and Networking, Proceedings of the 14th ACM international conference on Mobile computing and networking, Sep. 14-19, 2008, pp. 14-25.

(Continued)

*Primary Examiner* — Hunter B Lonsberry
(74) *Attorney, Agent, or Firm* — Gonzalez Saggio & Harlan LLP

(57) ABSTRACT

Described is a technology by which a remote or local geo-location service provides white space information that one or more client devices and/or base stations may use to determine which white spaces are available for use, e.g., for wireless networking. Because of the information, low-threshold sensing is not needed by the client devices and/or base stations to know which white spaces are available. The service computes the available white spaces for a given location based upon television transmitter parameters, elevation data, and information received regarding any operational wireless microphones.

20 Claims, 5 Drawing Sheets

OTHER PUBLICATIONS

Matinmikko, et al., "Cognitive Radio: An intelligent Wireless Communication System", Retrieved at << http://www.vtt.fi/inf/julkaisut/muut/2008/CHESS_Research_Report.pdf >>, Mar. 14, 2008, pp. 155.

Subramani, et al., "Spectrum Scanning and Reserve Channel Methods for Link Maintenance in Cognitive Radio Systems", Retrieved at < http://rose.bris.ac.uk/dspace/bitstream/1983/1232/1/siva_IEEE_VTC_spring%202008.pdf >>, Proceedings of the 67th IEEE Vehicular Technology Conference, VTC, May 11-14, 2008, pp. 1944-1948.

Liu, et al., "Sensing-based Opportunistic Channel Access", Retrieved at << http://www.cs.ucdavis.edu/~liu/paper/sensing.pdf >>, Mobile Networks and Applications, vol. 11, No. 4, Aug. 2006, pp. 1-28.

Whitt, Richard., "Introducing the White Spaces Database Group", Retrieved at << http://googlepublicpolicy.blogspot.com/2009/02/introducing-white-spaces-database-group.html >>, Feb. 4, 2009, pp. 4.

"Authorized Ex Parte Contact—Unlicensed Operation in the TV Broadcast Bands, FCC.", Retrieved at << http://hraunfoss.fcc.gov/edocs_public/attachmatch/DA-04-4013A1.pdf >>, Dec. 22, 2004, pp. 2.

"FCC Adopts Rule for Unlicensed Use of Television White Spaces", Retrieved at << http://radiomagonline.com/currents/news/fcc-adopts-rules-unlicensed-white-spaces-1105/ >>, Nov. 5, 2008, pp. 4.

"Rosum Corporation", Retrieved at << http://rosum.com/ >>, Retrieved Date: Dec. 24, 2009, pp. 1.

"Show My White Space", Retrieved at << http://showmywhitespace.com/ >>, Retrieved Date: Dec. 24, 2009, pp. 2.

"Shuttle Radar Topograph Mission (SRTM)", Retrieved at << http://www2.jpl.nasa.gov/srtm/ >>, Retrieved Date: Dec. 24, 2009, pp. 2.

"Skyhook Wireless", Retrieved at << http://skyhookwireless.com/ >>, Retrieved Date: Dec. 24, 2009, pp. 6.

"The Global Land One-Km Base Elevation Project (GLOBE),", Retrieved at << http://www.ngdc.noaa.gov/mgg/topo/globe.html >>, Retrieved Date: Dec. 24, 2009, pp. 2.

"The ITS Irregular Terrain Model Algorithm, NTIA, Department of Commerce.", Retrieved at << http://flattop.its.bldrdoc.gov/itm.html >>, Retrieved Date: Dec. 24, 2009, pp. 2.

"TV Fool", Retrieved at << http://www.tvfool.com/ >>, Retrieved Date: Dec. 24, 2009, pp. 2.

"Longley-Rice Methodology for Evaluating TV Coverage and Interference.", Retrieved at << http://www.fcc.gov/Bureaus/Engineering_Technology/Documents/bulletins/oet69/oet69.pdf >>, Feb. 6, 2004, pp. 15.

Jones, et al., "FCC Press Release, Evaluation of the Performance of Prototype TV-Band White Space Devices", Retrieved at << http://online.wsj.com/public/resources/documents/fcc10152008.pdf >>, Oct. 15, 2008, pp. 149.

Bahl, et al., "White Space Networking with Wi-Fi like Connectivity", Retrieved at << http://delivery.acm.org/10.1145/1600000/1592573/p27-bahl.pdf?key1=1592573&key2=6206561621&coll=GUIDE&dl=GUIDE&CFID=69650317&CFTOKEN=55287181 >>, ACM SIGCOMM Computer Communication Review, SIGCOMM '09, vol. 39, No. 4, Oct. 2009, pp. 27-38.

Broch, et al., "A Performance Comparison of Multi-Hop Wireless Ad Hoc Network Routing Protocols", Retrieved at << http://delivery.acm.org/10.1145/290000/288256/p85-broch.pdf?key1=288256&key2=2437561621&coll=GUIDE&dl=GUIDE&CFID=68071891&CFTOKEN=72132090 >>, International Conference on Mobile Computing and Networking, Proceedings of the 4th annual ACM/IEEE international conference on Mobile computing and networking, Oct. 25-30, 1998, pp. 85-97.

Chu, et al., "A Case for End SystemMulticast", Retrieved at <<http://delivery.acm.org/10.1145/340000/339337/p1-chu.pdf?key1=339337&key2=4147561621&coll=GUIDE&dl=GUIDE&CFID=68072143&CFTOKEN=60353992>>, SIGMETRICS, 2000, pp. 1-12.

Dandawatk, et al., "Statistical Tests for Presence of Cyclostationarity", Retrieved at << http://ieeexplore.ieee.org/stamp/stamp.jsp?tp=& arnumber=317857&isnumber=7659 >>, IEEE Transactions on Signal Processing, vol. 42, No. 9, Sep. 1994, pp. 2355-2369.

Deb, et al., "Dynamic Spectrum Access in DTV Whitespaces: Design Rules, Architecture and Algorithms", Retrieved at << http://delivery.acm.org/10.1145/1620000/1614322/p1-deb.pdf?key1=1614322&key2=8657561621&coll=GUIDE&dl=GUIDE&CFID=68072485& CFTOKEN=46307232 >>, International Conference on Mobile Computing and Networking, Proceedings of the 15th annual international conference on Mobile computing and networking, Sep. 20-25, 2009, pp. 1-12.

"FCC Media Bureau. TVQ TV Database", Retrieved at << http://www.fcc.gov/mb/video/tvq.html >>, Dec. 24, 2009, pp. 2.

Goldsmith, Andrea Jo., "Design and Performance of High-Speed Communication Systems over Time-Varying Radio Channels", Retrieved at << http://systems.stanford.edu/Publications/Andrea/thesis.pdf >>, Elec. Engin. Comput. Science, 1994, pp. 210.

Gurney, et al., "Geo-location Database Techniques for Incumbent Protection in the TV White Space", Retrieved at <<http://ieeexplore.ieee.org/stamp/stamp.jsp?tp=&arnumber=4658242& isnumber=4658211 >>, 3rd IEEE Symposium on New Frontiers in Dynamic Spectrum Access Networks, Oct. 14-17, 2008, pp. 1-9.

Katabi, Dina., "The Use of IP Anycast for Building Efficient Multicast", Retrieved at << http://ieeexplore.ieee.org/stamp/stamp.jsp?tp=&arnumber=832449&isnumber=17997 >>, In Proceedings of Global Telecommunications Conference, 1999, pp. 1679-1688.

Mishra, et al., "How much White Space is there?", Retrieved at << http://www.eecs.berkeley.edu/—sahai/Papers/HowMuchWhiteSpacelsThere.pdf >>, Technical Report No. UCB/EECS-2009-3, Jan. 11, 2009, pp. 1-16.

Otsason, et al., "Accurate GSM Indoor Localization", Retrieved at << http://www.placelab.org/publications/pubs/ubicomp2005-indoorGSM.pdf >>, In the Proceedings of UBICOMP, 2005, pp. 141-158.

Ratnasamy, et al., "Revisiting IP Multicast", Retrieved at << http://berkeley.intel-research.net/sylvia/frm-sigcomm06.pdf >>, Applications, Technologies, Architectures, and Protocols for Computer Communication, Proceedings of the 2006 conference on Applications, technologies, architectures, and protocols for computer communications, Sep. 11-15, 2006, pp. 12.

Sahai, et al., "Spectrum Sensing: Fundamental Limits and Practical Challenges.", Retrieved at << http://www.eecs.berkeley.edu/~sahai/Presentations/Dyspan_2005_tutorial_part_1.pdf >>, 2005, pp. 138.

Shellhammer, et al., "Technical Challenges for Cognitive Radio in the TV White Space Spectrum", Retrieved at << http://ita.ucsd.edu/workshop/09/files/paper/paper_1500.pdf >>, pp. 11.

Tandra, et al., "SNR Walls for Signal Detection", Retrieved at << http://ieeexplore.ieee.org/stamp/stamp.jsp?tp=& arnumber=4453895&isnumber=4453882 >>, IEEE Journal of Selected Topics in Signal Processing, vol. 2, No. 1, Feb. 2008, pp. 4-17.

Urkowitz, Harry., "Energy Detection of Unknown Deterministic Signals", Retrieved at << http://ieeexplore.ieee.org/stamp/stamp.jsp?arnumber=01447503 >>, Proceedings of the IEEE, vol. 55, No. 4, Apr. 1967, pp. 523-531.

Yuan, et al., "KNOWS: Kognitiv Networking over White Spaces", Retrieved at << http://research.microsoft.com/en-us/um/people/moscitho/publications/DySpan2007.pdf >>, In DySPAN, 2007, pp. 12.

"International Search Report", Mailed Dec. 28, 2011, Application No. PCT/US2011/041302 Filed Date Jun. 21, 2011, pp. 1-9.

* cited by examiner

ENABLING WHITE SPACE NETWORKS INDEPENDENT OF LOW-THRESHOLD SENSING

BACKGROUND

In the radio frequency spectrum, "white spaces" refer to radio frequency spectrum that was previously used by television broadcasters. One technology that is likely to benefit from white space availability is wireless networking in white spaces. In particular, wireless networks may significantly benefit from the propagation (long range) and building penetration properties of VHF and lower UHF bands compared to other unlicensed spectrum bands like the 2.4 or 5 GHz ISM bands.

In the United States, the Federal Communications Commission (FCC) is allowing unlicensed devices to opportunistically operate in white spaces. Other countries are considering similar regulations. However any such operation of an unlicensed device is (or will be) subject to meeting governmental regulations. For example, the FCC permits unlicensed devices to transmit in white spaces as long as they do not interfere with the primary licensed users of this spectrum, namely television broadcasters and wireless microphones.

To prevent any interference, spectrum sensing may be used to determine the presence of primary users. Because television receivers and wireless microphone receivers do not transmit RF signals, i.e., they are passive, unlicensed white space devices need to sense the presence of a primary user at very low thresholds, so as to ensure sufficient RF distance to the primary receiver and avoid causing interference. The FCC specifies this threshold to be −114 dBm; at least one other country is considering an even lower threshold.

However, while potentially feasible, sensing at such low thresholds is difficult from a technical perspective and is likely to require sensitive and expensive hardware. Also, sensing at such low thresholds may be inefficient in terms of energy consumption on the white space device. Current sensing technology is also prone to false alarms, as it tends to be overly conservative, which unnecessarily prevents unoccupied channels from being used and thereby wastes available white spaces.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards a technology by which a remote or local geo-location service provides white space information that one or more client devices and/or base stations may use to determine which white spaces are available for use, e.g., for wireless data networking. Because of the information, which is provided by the (proxy sensing) service, low-threshold sensing is not needed by the client devices and/or base stations to know which white spaces are available.

The transmitters of primary users (e.g., television stations and/or wireless microphones) relative to a location are determined. Based upon the transmitters, the service computes which white spaces are available for use in an area surrounding that location. The service may then disseminate data that identifies the white spaces that are available for use in that area, whether from a remote service to a white space client device, or from a local service running on the white space client device.

In one aspect, determining the primary users' transmitters comprises accessing television transmitter data corresponding to one or more television towers of television stations that are potentially broadcasting in the area, and accessing elevation data between the one or more television towers and the location. The elevation data is then used along with transmitter parameters to compute signal attenuation, from which white spaces are determined.

In one aspect, the presence of any wireless microphones operating in the area is included in the disseminated data. For a remote proxy sensing service, this may be obtained by manual registration or automatic detection from a -primary-user updater device that sends the information to the remote proxy sensing service. For a local proxy sensing service, e.g., operating in the white space client device, a beaconer device broadcasts presence information on behalf of a wireless microphone.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Various aspects of the technology described herein are generally directed towards a geo-location service that computes the available white spaces at any given location, and then disseminates this white space spectrum availability information to each white space device in the system (e.g., the white space availability information is "pushed" to the client devices). In this way, clients/base stations may operate in a white space without needing low threshold sensing to determine an available white space.

Base stations may push or otherwise make available the spectrum availability information to their clients, such as by adding detailed, and possibly location-tagged, spectrum availability within a beacon-packet that it periodically transmits. Clients generally know their own location, and thus can select the correct information from this beacon-packet to learn which channels are available at their respective locations. An alternative approach works by having clients use a local (portable) geo-location service that is updated periodically, and a beaconer-device that "beacons" the presence of wireless microphones.

It should be understood that any of the examples described herein are non-limiting examples. Indeed, while one example system is described that eliminates any need for low-threshold sensing, it is understood that such a system or a similar system may be supplemented with low-threshold sensing. As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used in various ways that provide benefits and advantages in computing and data transmission in general.

Figure 1:
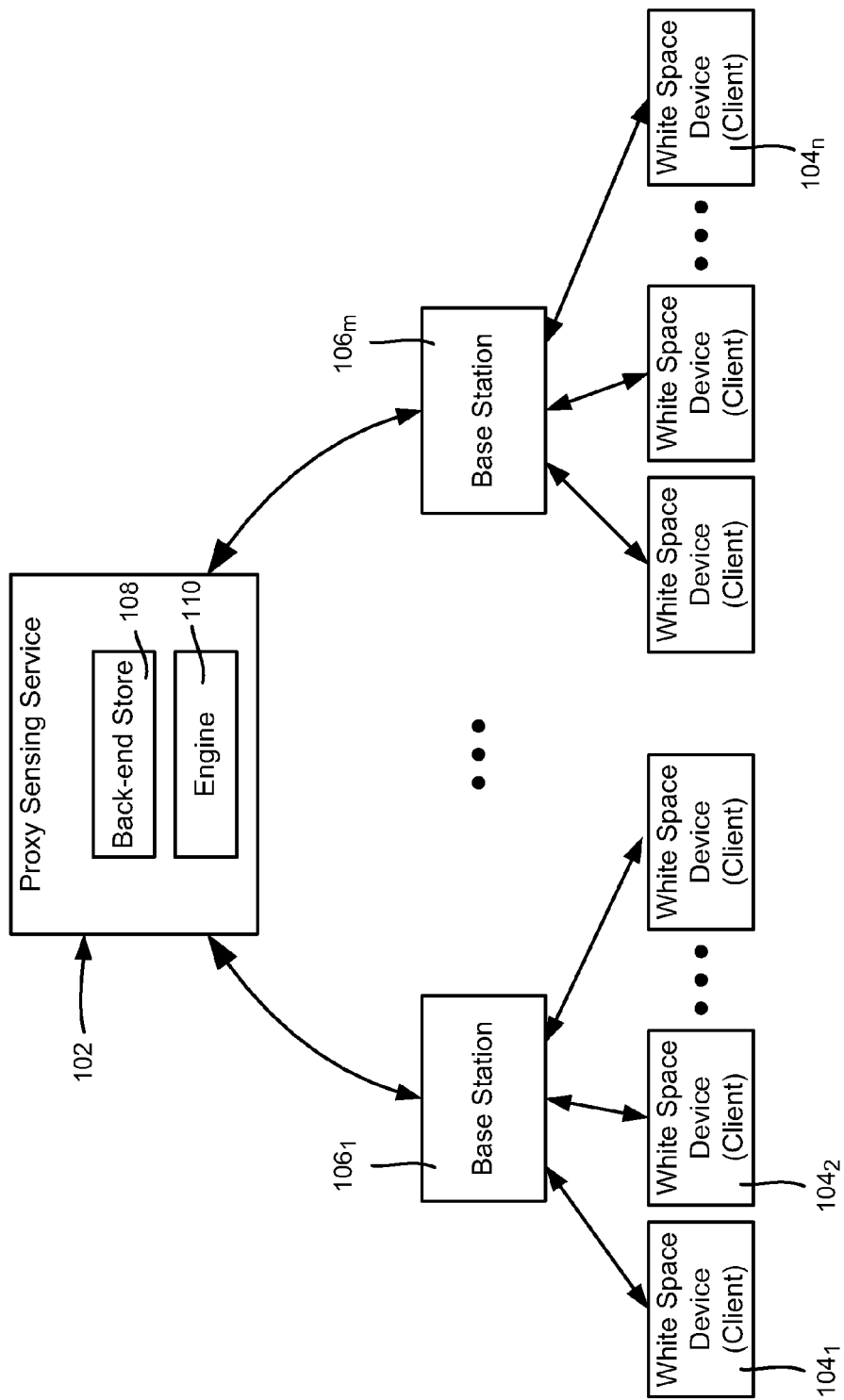
FIG. 1 is a block diagram showing example components for implementing a white space network that does not require low-threshold sensing to avoid interference.
Figure 2:
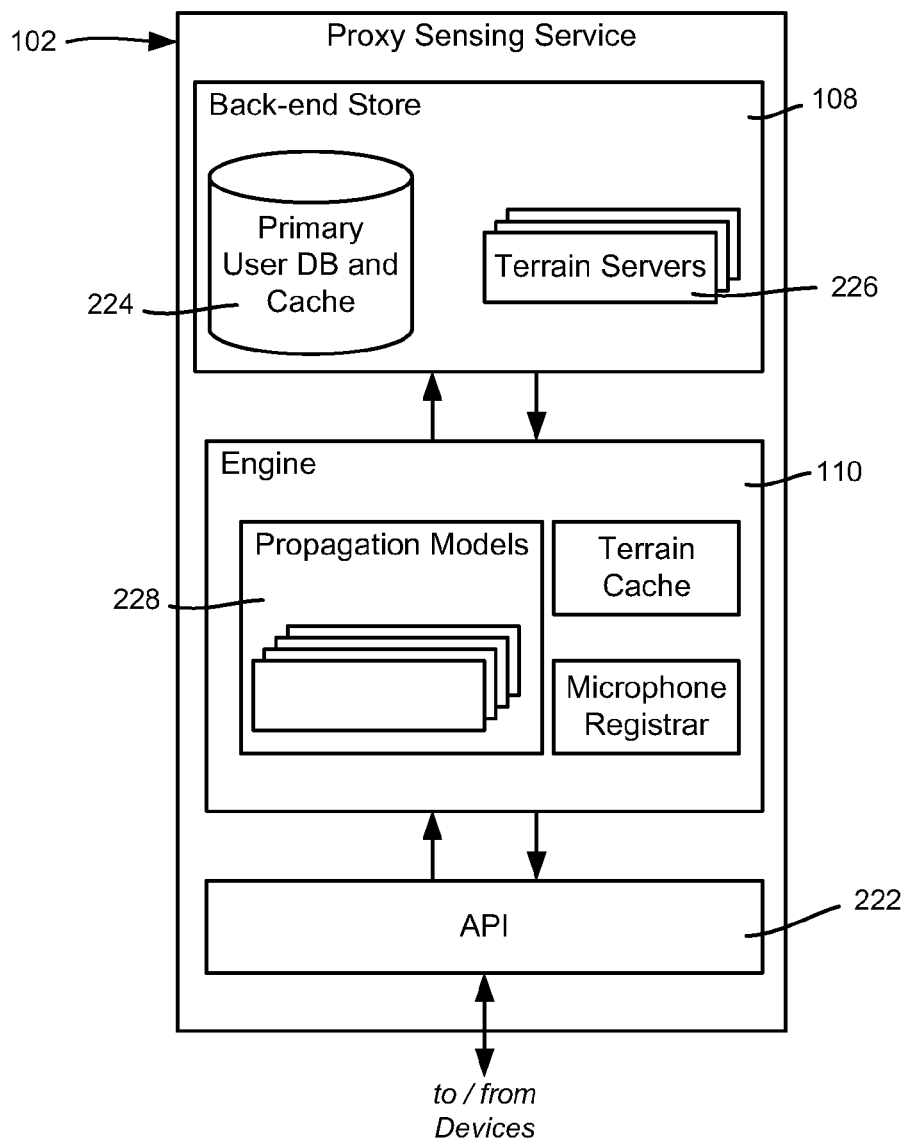
FIG. 2 is a block diagram showing example components of a proxy sensing service used in a white space network.

FIG. 1 shows various aspects related one example architecture/system of a proxy-sensing service 102, with FIG. 2 illustrating example internal components. White space devices $104_1$-$104_n$ (the clients) connect to the service 102 through base stations $106_1$-$106_m$. In general and as will be understood, the service 102 enables infrastructure-based wireless networks operating in white spaces, without requiring low-threshold sensing at the white space devices $104_1$-$104_n$ or at the base stations $106_1$-$106_m$. Indeed, as will be understood, the white space devices 104 may be configured to operate properly even without any local sensing at all (although supplemental sensing is feasible).

In the example shown in FIG. 1, the proxy sensing service 102 comprises a logically centralized entity that determines, for any given location, which parts of the spectrum are white spaces. Any change in spectrum occupancy (e.g., as a result of a TV transmitter being switched off at night or a wireless microphone being switched on) is reflected in the proxy sensing service 102. As the white space devices $104_1$-$104_n$ are not necessarily equipped with sensing capability, the white space devices $104_1$-$104_n$ rely on the proxy sensing service 102 to learn about the availability of white spaces at their respective locations.

Note that it is feasible to have clients that do not know their locations, however this is inefficient. More particularly, if a client's location is not known, a base station needs to be very conservative and use only those channels that are available even in the most distant area of its coverage area (because in the absence of more precise knowledge, the client potentially may be anywhere within this coverage area). Second, due to changes in terrain profile, there are often points in the coverage area of the base station that receive better signal reception from TV transmitters than other points. As a result, the white spaces availability in such locations is lower than other surrounding points. Hence, to function more effectively, a system without sensing at white space client devices needs clients to have location information, e.g., accurate to within approximately a half mile.

In one implementation, one task of the proxy sensing service 102 is to respond to client queries or the like with accurate data regarding white space availability for a given location. The white spaces availability may be in the form of a bitmap of channel availability at a given location, where location is represented by L=Latitude, Longitude.

To communicate with the service 102, one set of example APIs 222 (FIG. 2) provided by the service 102 is shown in the following table:

| API | Description |
| --- | --- |
| GetWhiteSpaces(L) | Returns white spaces at location L |
| GetPrimaries(L) | Returns list of primaries and RSSI at L |
| UpdatePrimary(p) | Update information on a primary p |
| Register(n, L) | Register BS/client n with grid location L |
| CoverageArea(b) | Computes coverage area for a base station (BS) b |
| SetCover(b) | Computes set cover channels for coverage area of BS b |

The proxy sensing service 102 may operate in different modes, including that it may be queried with a specific location given as input. Alternatively, using a publish-subscribe model, the proxy sensing service 102 may track changes in the white spaces availability of a base station or its associated clients. On detecting changes in the white spaces availability at any of these locations, the service 102 fires an event or the like that informs the base station of the changes in white spaces availability either at the base station itself or at one its clients. To support both modes, an active connection is maintained between the service and each base station. The base station then disseminates this spectrum availability information to its clients using beacon packets. Thus, in case the base station receives spectrum information in a publish-subscribe model, the entire information dissemination process from service 102 to the white space clients is push-based, that is, first from the service 102 to the respective base station, and then from the base station to its clients.

Having a proxy node results in a delay in learning about changes in spectrum availability. Either the device has to poll the proxy, or the proxy will have to push updates to the device (or some combination of both). When white space devices are mobile, a device may travel some distance between the times that it receives two subsequent spectrum updates. To address this problem, the base station adds a protection range for mobile devices to determine the white spaces that this mobile device can use. That is, even though a channel might be available at a device's location, it cannot use it if this channel is blocked off at any location within a threshold distance of the current location. For example, for a polling interval of one minute, a mobile client that accurately knows its location and can travel at sixty miles per hour adds a protection range of one mile; however this results in a twenty percent loss of available white space spectrum. As can be appreciated, a tradeoff between the latency of spectrum change dissemination versus the loss of available white space spectrum may be made to provide desired results.

The accuracy of the spectrum map generally depends on the quality of the propagation model and fine granularity of the terrain data. As represented in FIGS. 1 and 2, the proxy sensing service 102 includes a back-end store 108 that maintains the terrain and primary user data (such as TVs and wireless microphones) and an engine 110 that accurately computes the white spaces availability at a location.

In one implementation generally represented in FIG. 2, the back-end store 108 includes a database (DB) 224 and one or more terrain servers 226. The database 224 stores information/parameters on television transmitters, including the television tower location, channel, height, transmit power, antenna directionality, mechanical beam tilt, and so forth, which are updated on a regular (e.g., daily) basis. In the United States, this is based on publicly available data from the FCC's Consolidated Database System (CDBS). The database 224 and/or engine 110 also may store wireless microphone registration data, including the location of each wireless microphone, channel, and time of last report. The obtaining of wireless microphone registration data is described below.

Note that the database 224 and/or engine 110 also may serve as a cache for the white spaces availability previously computed for various locations.

The terrain server (or servers) 226 provides terrain elevation data at any arbitrary point on the planet's surface. The terrain server 226 thus stores worldwide terrain elevation data, which may be obtained from various publicly available government efforts for mapping the planet's terrain. Various elevation data sets may be used, e.g., measured at one kilometer intervals across the planet's surface, or higher resolution (e.g., obtained from NASA) measured at thirty meter intervals.

The terrain server provides terrain elevation data between two points at a specified interval. For example, the terrain server 224 may receive a request specifying (LTX, LRX, Interval), where LTX and LRX are the coordinates for the transmitter and receiver, respectively, and interval is the resolution at which terrain data is sampled between these two points. Given this input, the server computes a direct path between the LTX and RTX along a great circle, and returns elevation samples between the two points at the specified interval.

Figure 3:
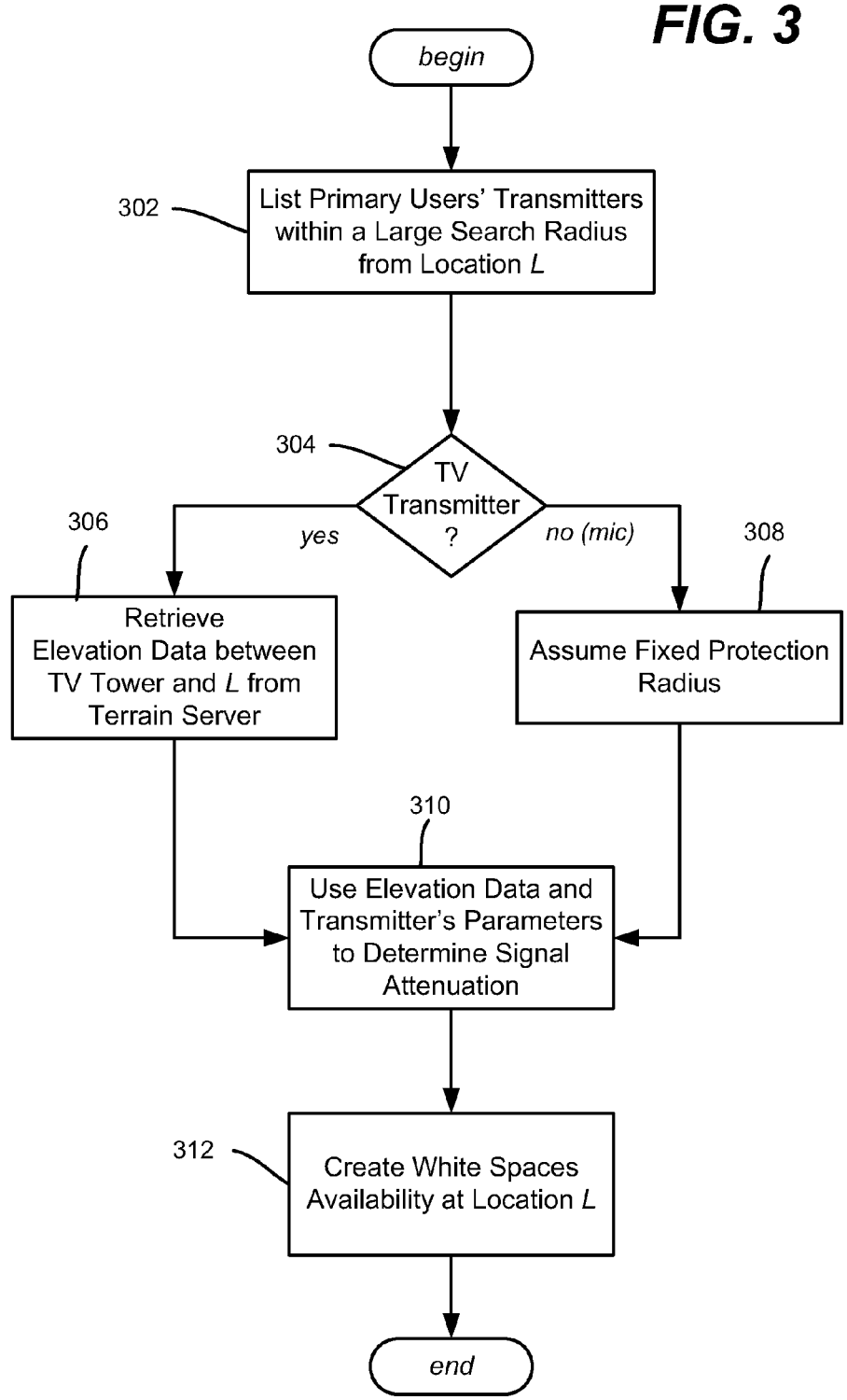
FIG. 3 is a flow diagram showing example steps for determining white spaces based upon various available data.

To accurately determine the white spaces availability at a location L, the engine 110 computes the attenuation of UHF or VHF signals via propagation modeling, such as by performing the steps exemplified in FIG. 3. Step 302 lists the primary user's transmitters within a large search radius from L. Conservatively, these are all the primary users whose signals could potentially be heard at L at an RSSI (Received Signal Strength Indicator) greater than the specified threshold.

As determined by step 304, if the primary is a TV transmitter, at step 306 the engine retrieves the elevation data between the TV tower and L from the terrain server. If the primary is a microphone, step 308 assumes a conservative fixed protection radius around it.

At step 310, the elevation data in conjunction with the transmitter's parameters (such as height, power, antenna directionality, and so forth) are used to determine the signal attenuation, such as by using the known Longley-Rice (L-R) propagation model. The attenuation in turn is used to compute the RSSI of the transmitter at L.

At step 314, the white spaces availability at location L is created. As part of this, a channel C is deemed to be blocked if there is at least one primary who is active, e.g., an incumbent whose RSSI at L is greater than −114 dBm. This may be mapped as follows:

$$Map_L(C) = \begin{cases} 1 & \text{if an incumbent is active on } C \text{ at } L \\ 0 & \text{otherwise} \end{cases}$$

Note that this process determines the attenuation of a UHF signal over a certain distance and how this affects the RSSI. This may be achieved via propagation modeling of RF signals using any known propagation models 228 (FIG. 2) for RF signals, each of varying complexity and accuracy, including Free Space, Hata, Egli, and Longley-Rice (L-R) with terrain, and/or L-R (without terrain).

Due to errors in measurement and conversion, it is common to find 'holes' in the elevation data sources. These are more prevalent in higher resolution data, and governmental agencies responsible for the data take additional steps to 'fill in' these holes via a variety of techniques such as bilinear interpolation or gradation smoothing. However, anomalies in the terrain data still exist, which in turn impacts the results of the terrain-based propagation models. For example, the L-R implementation returns an error code signaling errors in which parameters are out of range, which are typically caused by errors in the elevation data. To counter such anomalies, an adaptive elevation switching strategy may be implemented, whereby for a signal propagation computation between two points, the higher resolution elevation data is first tried. If the propagation model returns an error stating some parameters are out of bounds, the path profile between the two points is examined to determine if there are holes in the path. If so, the lower resolution data is used. If that fails as well, the L-R (no terrain) model is used, comprising an L-R variant that computes signal propagation without taking elevation data into account (as opposed to point-to-point which factors in elevation data between two points). This strategy significantly improves the accuracy of the results by reducing false positives and false negatives.

Turning to another aspect, low-power, transient primary user transmitters (for example wireless microphones) can be supported in various ways, including by manual updates, in which an API is provided to add an entry for a microphone as a primary user, whereby authorized users can add an entry for the microphone's frequency channel, transmit power and the location and duration of the event. The service 102 then treats microphone transmitter as a (very) low power TV tower for the specified duration. These entries can be expired after a time out period.

Figure 4:
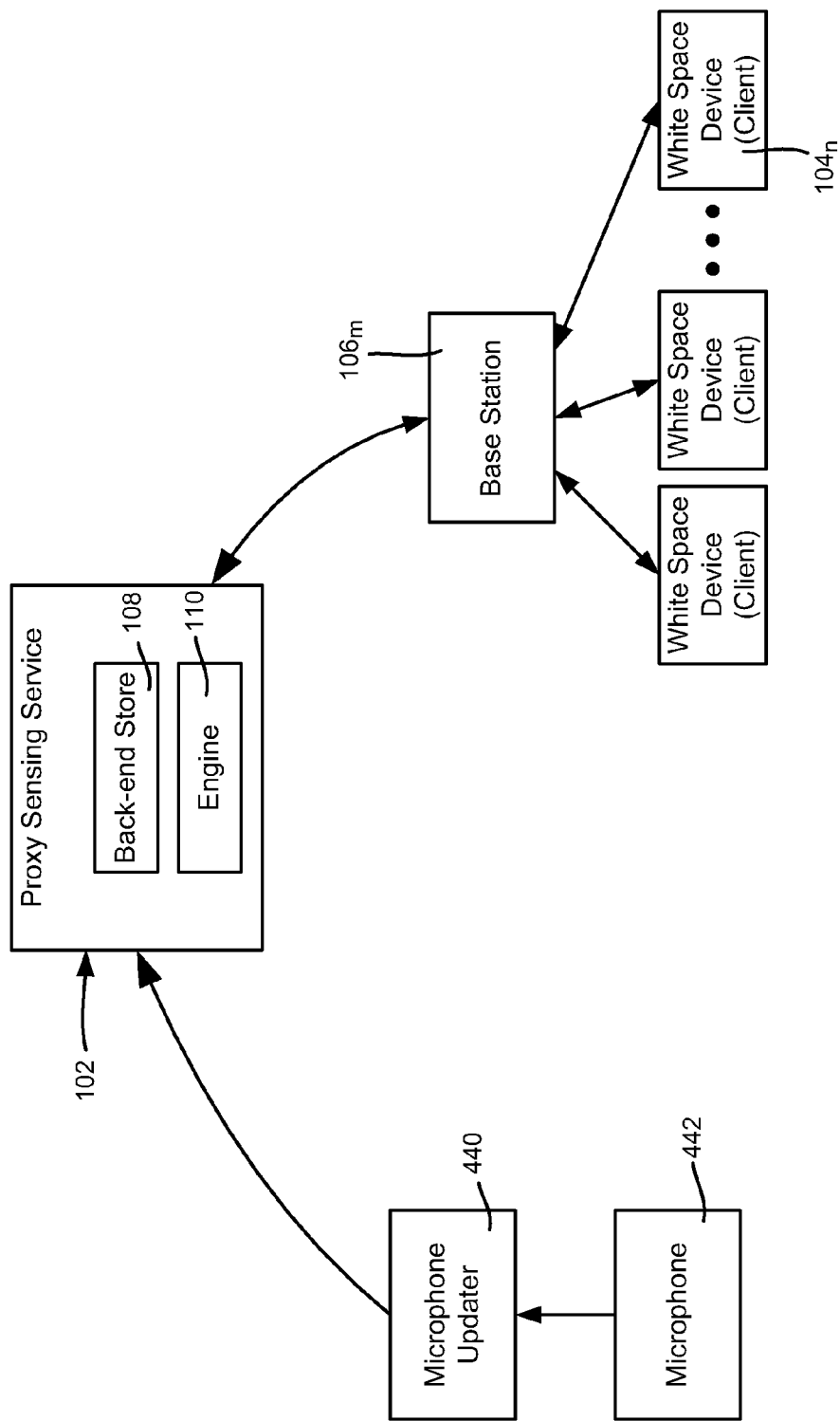
FIG. 4 is a block diagram showing example components of how the presence of primary users may be detected for avoiding possible interference in a white space network.

An alternative to manually updating the primary user database is a microphone updater, comprising a small device that is plugged in relatively close to the wireless microphone receiver. As represented in FIG. 4, such an updater 440 detects the presence of a microphone 442 and automatically updates the back-end store 108, e.g., using the UpdatePrimary API. This information is then provided to the appropriate base station and its devices.

The updater may use an alternative technology, such as 3G, Wi-Fi, Ethernet, and so forth to connect to the proxy sensing service 102. When the updater 440 does not detect the microphone 442 for a predefined amount of time (e.g., five minutes), the entry is deleted from the database. Note that this solution does not simply move the difficulty of low-threshold sensing from the client device to the microphone updater, because the microphone updater is powered and close to the microphone, and thus does not require expensive and complex low-threshold sensing. This reduces the number of false negatives/positives as well as lowers hardware cost.

During the operation of the system, each base station learns about which channels are available at itself and its clients in order to select a feasible white space channel. To convey this information, every client periodically sends its location and the technology used to determine the location to its associated base station. The base station uses this information to determine the commonly available white spaces at the client and itself. From among all these usable white spaces, the base station selects an appropriate channel, and clients associate to the base station on this channel.

The base station also subscribes to push updates from the proxy sensing service 102 at the client's location as well as grid points around it depending on the location error of the technology used to determine the location. Conservative values may be for the location error, e.g. 50 meters for GPS, 150 meters for Wi-Fi and 1.0 mile for GSM-based localization. Location can be determined by any means, including existing technologies based, e.g. GPS, Wi-Fi or GSM; further, TV-based technology may be used for localization.

The above approach works once the clients are associated to the base station and as long as white space availability does not change. However, there is a need to solve the bootstrapping problem, (a known problem in any system in which clients do not have sensing capability). More particularly, when a new client arrives, the client cannot transmit any packets since it does not know the white spaces availability at its location. Therefore, it is unable to even transmit its location to the base station, because the corresponding packet may interfere with a nearby primary user. This bootstrapping problem does not occur if the base station transmits on a channel that is available at every location in its coverage area. In that situation, a client may discover the base station and associate to it. However, such a commonly available channel across the entire coverage area does not exist in many places, and even in places where such a channel exists, using only this channel results in a significant loss of white spaces. Instead, the channel selection at the base station in this technology takes into account actual client locations, which results in the bootstrapping problem.

To resolve this problem, every base station periodically (e.g., once every second) broadcasts a beacon containing the channel availability in the regions of its coverage area. In one implementation, a beacon contains, for each grid-point in the base station's coverage area, one available channel that a client located at that grid-point may use to contact the base station. At a lower rate (e.g., once every minute), the base station switches to each of these channels and listens for clients that want to join; (the switching overhead can be reduced by using known techniques). When a client joins the system, it listens for beacons from the base station and moves to the channel that is marked in the beacon as being available in the grid location pertaining to the client's current location. The client then broadcasts its location on this channel, which is eventually picked up by the base station. Upon receiving this message, the base station now knows this client's location. In this manner, the beacon is used as a lookup table by client when bootstrapping.

As set forth above, there is a need to efficiently communicate the channel availability for the regions in the base stations coverage area, as transmitting one channel for every grid-point in the coverage area of a base station will result in prohibitively large beacons. For instance, at a coverage range of 10 miles, and a grid-granularity of 100 m, the beacon size is more than 100 KB, if 5 bits are used to encode a channel number. To reduce the beacon size, the base station may perform an initialization phase, where the base station queries the proxy service's engine to compute its potential coverage area (PCA). The potential coverage area is defined as the set of grid points in 100 m×100 m steps where the receive signal strength from the base station is greater than −90 dBm, i.e. the receive sensitivity at the lowest rate for many wireless cards. The potential coverage area may be computed using the L-R model. For every grid point within its potential coverage area, the base station then retrieves the set of available channels.

During the operation of the network, the base station uses this information to compute a minimum channel cover (MCC). An MCC for a potential coverage area A is a set of white space channels of minimum (or generally, low) cardinality, such that for every grid point location within A, there is at least one available white space channel in the channel cover. A standard greedy set-cover approximation algorithm may be used to compute a good approximation to the MCC.

The base station knows that at least one of the channels in MCC is available at all grid points in its coverage area A. The beacon contains the set of channels included in the computed $MCC_A$, and a listing of one available channel from among the channels in $MCC_A$ for every grid point in its coverage area (e.g., given in row major form). Each channel is encoded using $\lceil \log(|MCC_A|) \rceil$ bits. Based on empirical measurements, it can be determined that the size of MCCA is at most four in the United States, such that two bits per grid-location suffices. A base station may further use RLE compression (or other compression techniques) to compress MCCA information about adjacent grids where the channel availability is similar.

To handle updates in spectrum availability, such as the appearance of a microphone, a base station subscribes for push updates from the service 102 for all grid points in its coverage areas. Therefore, when a microphone is switched on and the service 102 receives notification of this event, it first quickly determines those grids impacted by the microphone. The time taken to do this is very low (less than 500 ms when supporting up to 1,000 microphones being concurrently switched on). Based on this information, the engine determines if a microphone is switched on in the coverage area of a base station. If so, the base station is notified of those grids that are impacted by this change in the white spaces availability. This may be done automatically as part of computing the PCA, as described above.

When either a new primary user appears, or the parameters of an existing primary user change, the engine computes the changes to the affected grid points around the primary user and sends the updates to the base stations that have subscribed to changes for these grid points. If needed, the base station re-computes the spectrum over which it is operating and/or the contents of the beacon. Note that this affects the latency in propagating a change in the available white spaces.

Further note that when a primary user is already active, the push-based system architecture efficiently handles client mobility. Because the base station has an up-to-date view of spectrum availability and the client locations, the base station can pre-compute and adapt in advance to the spectrum that is available at its clients, thereby avoiding client disconnections as well as interference with the primary users.

As described above, one implementation of the technology has clients and base stations connect to the proxy sensing service 102 over the Internet (and/or other suitable network connections) in order to determine which channels are available for wireless communication. However, alternative designs may be more appropriate, such as in a peer-to-peer/ad hoc mode in which clients operate outside the range of any fixed infrastructure network with an Internet connection. Further, if there is an Internet failure, white space network operation would be disrupted. In the event of unexpectedly high delays, the update latencies between the proxy sensing service 102 and some base stations could increase, which can have a negative impact, as the amount of white spaces that can be marked as available need to decrease (to maintain the necessary safety margin), or some channels might wrongly be marked as free/not-free. Further, some microphone users may be unable to insert their microphone into the database, in which case these microphones may not be protected.

Figure 5:
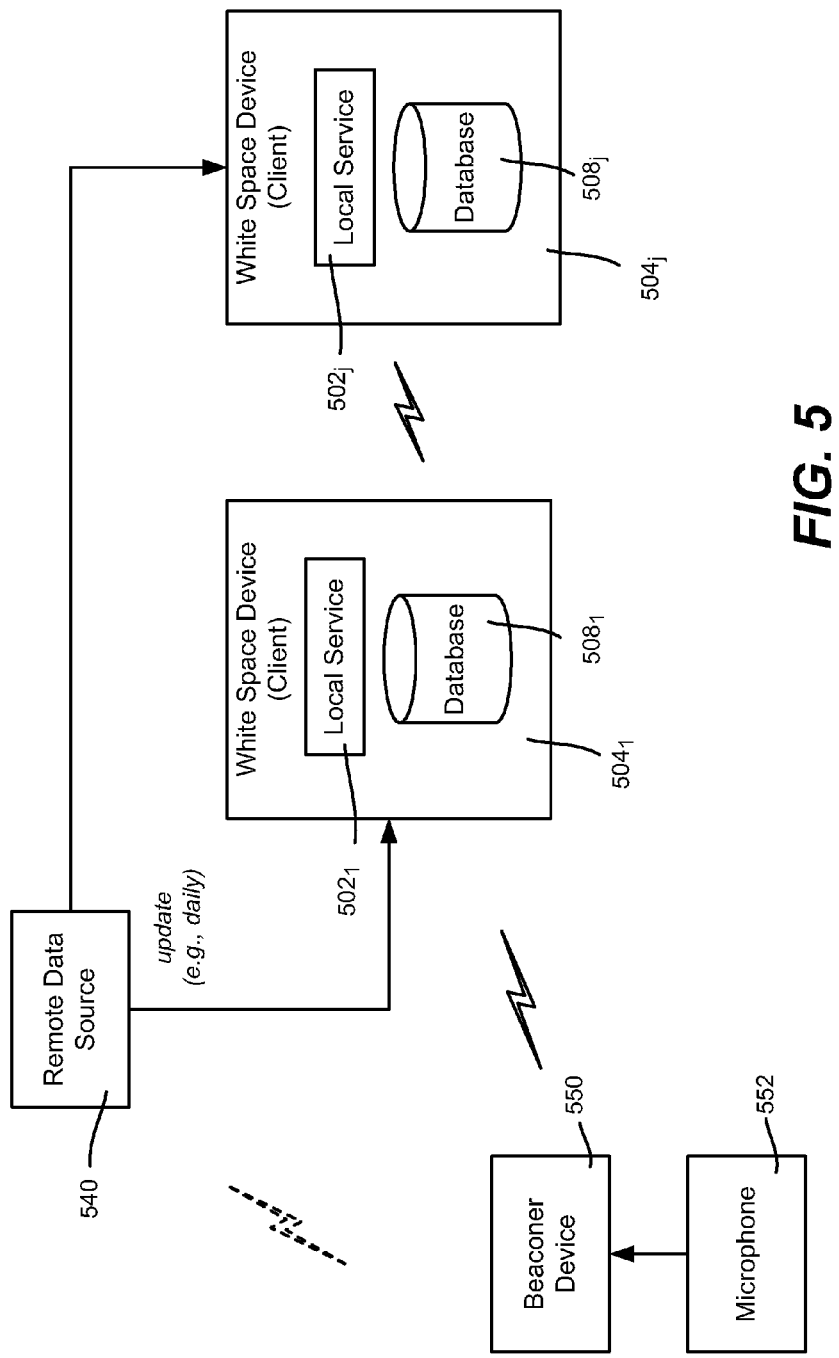
FIG. 5 is a block diagram showing example components for implementing an alternative implementation of a white space network that does not require low-threshold sensing to avoid interference.

To address these issues, as represented in FIG. 5, a device-local ("portable") geo-location service (e.g., $502_1$-$502_j$) may be provided by having white space devices (clients) be equipped with a local database (e.g., $508_1$-$508_j$) that can be queried purely locally (i.e., on the device itself). The database can be updated periodically, (for example once a day), when the device has remote connectivity, by a remote data source 540. A device can query the remote data source 540, which may comprise the remote proxy sensing service 102, however because the device's service is running locally, no Internet connectivity is required when using the local service. This approach can also be used on mobile phones or other portable devices, in which case the local geo-location database can be considered a portable geo-location database.

There are various ways of implementing a local or portable geo-location service that allows for disconnected operation in the white spaces. One way is to run an instance of the proxy sensing service locally, namely the device (e.g., $504_1$) determines its own location using any appropriate localization service (e.g., GPS or any other means), whereby via its service $502_1$, the device $504_1$ issues a query to its own local geo-location database $508_1$ that is running in the device. An appropriate signal propagation model (e.g. L-R with terrain data) is then computed to determine the available white spaces at the current location.

An alternative implementation pre-computes the locations in advance (e.g., at the remote data source 540) and stores the white space availability on the white space device in the form of a relatively large database. Given a query, instead of re-computing spectrum availability, the device $504_1$ performs a look-up in its database $508_1$ for the corresponding stored data values. This implementation is likely to be more efficient in terms of query latency and energy efficiency, but may require more data to be stored on the device.

The local geo-location service works well for primary users that are relatively static and whose specifications do not change too frequently. In the context of white spaces, the local geo-location service will thus work well for television stations that are unlikely to change very dynamically. However, because the data underlying the local geo-location service is not updated very frequently, it may not be capable of handling highly dynamic primary users, such as wireless microphones, that appear and disappear at diverse locations and at unpredictable times.

A solution for dealing with wireless microphones (and possibly other highly-dynamic primary users) while still not requiring low-threshold sensing on client devices is to use a hardware device, referred to as a beaconer-device 550 (FIG. 5). The general goal of a beaconer-device is to detect one or more wireless microphones 552 (or other primary users) and to inform nearby white space devices of the presence of this microphone/user. White space devices may also inform each other of the presence, and or the remote data source may detect the beaconer device's signal either directly or indirectly through another device.

Similar to the microphone updater of FIG. 4, a beaconer device 550 is applied in the vicinity of a microphone 552 (for example, by simply plugging it into the wall). When in operation, the beaconer device 550 listens for wireless microphones by scanning the appropriate spectrum and applying a suitable microphone detection technique. Note that because the beaconer is operated in the vicinity of the wireless microphone, and because the beaconer itself does not transmit using the same spectrum as the wireless microphone, the beaconer device does not necessarily require low-threshold sensing capability. It is sufficient if the beaconer is capable of detecting microphones at relatively high sensing thresholds, which can significantly reduce the complexity (and cost) of designing and manufacturing such devices.

When the beaconer has detected a wireless microphone, it periodically transmits beacon-signals; (note that this is different from a microphone updater that contacts the remote service 102, although it is feasible to have a device that is both a microphone updater and a beaconer device). The transmission power at which this beacon-signal is transmitted is higher than the microphone power, in order to make sure that even white space devices that further away can detect this beacon signal without requiring low-threshold sensing. Furthermore, the beacon-signal can be transmitted in a different part of the spectrum (typically lower frequencies), that has better signal propagation characteristic and hence longer range. For example, a beaconer device can signal the presence of a wireless microphone (which operates in the UHF spectrum band) in the lower-frequency VHF spectrum band, which has more range. This way, the beaconer device's transmission power may not need to be higher than the microphone power, yet the beaconer device's signal still achieves the required large protection range for the microphone. The beacon-signal contains (in encoded form), the information of which part of the spectrum is occupied by the wireless microphone.

When a white-space device detects a beacon-signal, it learns that it is unable to use the signaled part of the spectrum. If it is currently operating using this part of the spectrum, it can either stop transmitting, or move to another channel.

The beaconer can be implemented in several ways using known techniques for detecting microphones (based for example by employing matched filtering, energy detection, or feature detection). The beaconer can either transmit its beacon signal "in-band", i.e., using the same TV-channel (UHF) that is also used by the wireless microphone. Since microphones typically have very narrow transmissions (about 200 kHz), there is sufficient space for the beaconer-device to transmit within the same 6 MHz TV channel spectrum, while not overlapping with the narrow transmission of the microphone.

Alternatively, the beaconer can transmit its beacon signal on some other channel that is available. A client device then needs to listen for such beacon signals "out-of-band", i.e., clients periodically listen to other channels to see whether there are any beacon signals for the channel it is currently using. For example, the beaconer device may transmit on an unused VHF channel, as the VHF band is not used for wireless microphones, and an infrequent (e.g., daily) update generally suffices to determine which VHF channels are unused.

As can be seen in this alternative architecture, each client device employs a local geo-location database that it synchronizes (updates) periodically when connected to the Internet (for example, once a day). This ensures that the device does not interfere with TV stations (or other static primary users). In addition, in order to avoid interference with dynamic primary users (microphones), beaconer-devices signal the presence of such microphones. Again, no device requires low-threshold sensing in this architecture.

If only infrastructure-based networks are supported, then it is further possible that only the base station need to listen for beaconer signals for microphone protection. The base stations can then push this microphone information to the associated clients in the same way as described above. In this case, clients do not require any sensing capability at all.

In practice, arbitrary hybrid combinations of the remote "online" architecture and the alternative local "offline" architecture based on local geo-location service and beaconer-device are feasible. For example, some clients may use the online architecture, while others use the offline approach. Clients may use the online architecture as long as connected via some gateway (e.g., base station) to the Internet, and automatically switch to the offline local architecture if connectivity is lost. A beaconer may also act as a microphone updater, e.g., both broadcasting to white space devices and to a remote service.

Note that a mobile node may not need the entire data for its local geo-location service. For example, if a device knows approximately where it is going to operate within the next day (or generally, the next update period), only the data that is required to determine spectrum availability in these locations need be maintained locally for the local geo-location service.

CONCLUSION

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. In a computing environment, a method performed on at least one processor, comprising:
   determining transmitters of primary users relative to a location;
   computing which unused spectrum are available for use in an area surrounding that location based upon the transmitters, wherein computing the available unused spectrum comprises using at least one of a protection radius or elevation data; and
   disseminating data that identifies the unused spectrum that are available for use in that area.

2. The method of claim 1 further comprising:
   receiving the data on a client device and operating a wireless network over one of the white spaces.

3. The method of claim 1 wherein determining the primary users' transmitters comprises accessing television transmitter data corresponding to one or more television towers of television stations that are potentially broadcasting in the area, and accessing elevation data between the one or more television towers and the location.

4. The method of claim 1 wherein the protection radius is used to avoid interference with a wireless microphone.

5. The method of claim 1 wherein computing the which unused spectrum are available for use further comprises determining signal attenuation using elevation data and parameters of the transmitters.

6. The method of claim 5 wherein determining the signal attenuation comprises using propagation modeling.

7. The method of claim 6 wherein using propagation modeling comprises accessing relatively high resolution elevation data for use in determining the signal attenuation via terrain-based propagation modeling, determining whether propagation modeling returns an error with the relatively high resolution elevation data, and if so, accessing lower resolution data for use in determining the signal attenuation via terrain-based propagation modeling.

8. The method of claim 7 wherein using propagation modeling comprises determining whether propagation modeling returns an error with the lower resolution elevation data, and if so, using a propagation model without terrain-based propagation modeling.

9. The method of claim 1 further comprising:
   outputting information from a base station, the information corresponding to a grid of points within the area and availability information corresponding to channels for at least some of the points.

10. A system comprising:
    a geo-location service configured to act as a proxy for determining which parts of a broadcast spectrum are white spaces, the geo-location service determining the white spaces based in part upon data corresponding to television tower parameters and terrain data; and
    a white space device configured to obtain data from the geo-location service to determine a white space for communicating data wirelessly over a white space network, wherein the geo-location service is located remotely from the white space device.

11. The system of claim 10 wherein the geo-location service further provides data corresponding to at least one wireless microphone operating in the broadcast spectrum.

12. The system of claim 11 wherein the geo-location service receives information corresponding to at least one wireless microphone operating in the broadcast spectrum from a microphone updater device.

13. The system of claim 10 wherein the geo-location service is located locally relative to the white space device.

14. The system of claim 13 wherein the geo-location service determines transmitters of primary users relative to a location, and computes which white spaces are available for use in an area surrounding that location.

15. The system of claim 13 wherein the geo-location service determines the white spaces by looking up the white spaces that the white space device has remotely downloaded into a database, in which the data downloaded is provided by a remote source based in part on television tower parameters and terrain data.

16. The system of claim 13 wherein the geo-location service receives information corresponding to at least one wireless microphone operating in the broadcast spectrum from a beaconer device.

17. The system of claim 16 wherein the beaconer device operates in a same broadcast channel as the wireless microphone, or operates on an out-of-band channel relative to the wireless microphone.

18. The system of claim 16 wherein the wireless microphone operates over a UHF channel, and wherein the beaconer device operates over a VHF channel.

19. One or more computer storage devices having computer-executable instructions, which in response to execution by a computer, cause the computer to perform steps, comprising:
    obtaining a set of one or more transmitters of primary users' within an area relative to a location;
    for each transmitter, determining whether the transmitter is a television transmitter, and if not, applying a fixed protection radius, and if so, retrieving elevation data between a television tower and the location;
    for each transmitter, using any elevation data and parameters of the transmitter to determine signal attenuation; and
    determining from the signal attenuation a set of one or more white spaces that are available at the location.

20. The one or more computer storage devices of claim 19 having further computer-executable instructions comprising:
    disseminating data that identifies the one or more white spaces to at least one base station.

* * * * *